US009965726B1

United States Patent
Tablan et al.

(10) Patent No.: US 9,965,726 B1
(45) Date of Patent: May 8, 2018

(54) ADDING TO A KNOWLEDGE BASE USING AN ONTOLOGICAL ANALYSIS OF UNSTRUCTURED TEXT

(71) Applicant: Amazon Technologies, Inc., Seattle, WA (US)

(72) Inventors: Mihai Valentin Tablan, Cambridge (GB); Andrew Graham Fenn, Sawston (GB); David Spike Palfrey, Cambridge (GB); Petra Elisabeth Holmes, Cambridge (GB); Sina Samangooei, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 448 days.

(21) Appl. No.: 14/696,214

(22) Filed: Apr. 24, 2015

(51) Int. Cl.
*G06F 15/18* (2006.01)
*G06N 3/00* (2006.01)
*G06N 3/12* (2006.01)
*G06N 99/00* (2010.01)
*G06F 17/30* (2006.01)

(52) U.S. Cl.
CPC ..... *G06N 99/005* (2013.01); *G06F 17/30867* (2013.01); *G06N 3/126* (2013.01)

(58) Field of Classification Search
CPC combination set(s) only.
See application file for complete search history.

(56) References Cited

U.S. PATENT DOCUMENTS

| 7,013,308 | B1 | 3/2006 | Tunstall-Pedoe |
| 7,707,160 | B2 | 4/2010 | Tunstall-Pedoe |
| 8,219,599 | B2 | 7/2012 | Tunstall-Pedoe |
| 8,468,122 | B2 | 6/2013 | Tunstall-Pedoe |
| 8,666,928 | B2 | 3/2014 | Tunstall-Pedoe |
| 8,719,318 | B2 | 5/2014 | Tunstall-Pedoe |
| 8,838,659 | B2 | 9/2014 | Tunstall-Pedoe |
| 9,098,492 | B2 | 8/2015 | Tunstall-Pedoe |
| 9,110,882 | B2 | 8/2015 | Overell et al. |
| 9,262,411 | B2 * | 2/2016 | Woodward .......... G06F 17/2836 |
| 9,286,910 | B1 * | 3/2016 | Li ......................... G10L 25/48 |
| 9,436,681 | B1 | 9/2016 | Tunstall-Pedoe et al. |
| 9,466,294 | B1 * | 10/2016 | Tunstall-Pedoe . G06F 17/30654 |
| 9,519,681 | B2 | 12/2016 | Tunstall-Pedoe |
| 9,582,757 | B1 * | 2/2017 | Holmes ..................... G06N 5/04 |
| 9,646,260 | B1 | 5/2017 | Tunstall-Pedoe et al. |
| 9,659,052 | B1 * | 5/2017 | Glennon ........... G06F 17/30386 |
| 9,805,089 | B2 * | 10/2017 | Tunstall-Pedoe . G06F 17/30386 |
| 2007/0043708 | A1 | 2/2007 | Tunstall-Pedoe |
| 2007/0055656 | A1 | 3/2007 | Tunstall-Pedoe |
| 2009/0070284 | A1 | 3/2009 | Tunstall-Pedoe |
| 2009/0192968 | A1 | 7/2009 | Tunstall-Pedoe et al. |
| 2010/0205167 | A1 * | 8/2010 | Tunstall-Pedoe . G06F 17/30386 707/706 |

(Continued)

OTHER PUBLICATIONS

A case-based reasoning approach to the reusability of CWM metadata Lamiae Demraoui; Hicham Behja; El Moukhtar Zemmouri; Rachid Ben Abbou 2016 Third International Conference on Systems of Collaboration (SysCo) Year: 2016 pp. 1-6 IEEE Conferences.*

(Continued)

*Primary Examiner* — Michael B Holmes
(74) *Attorney, Agent, or Firm* — Weaver Austin Villeneuve & Sampson LLP

(57) ABSTRACT

Techniques are described for adding knowledge to a knowledge base.

16 Claims, 3 Drawing Sheets

(56) References Cited

U.S. PATENT DOCUMENTS

| | | |
|---|---|---|
| 2011/0307435 A1 | 12/2011 | Overell et al. |
| 2012/0036145 A1 | 2/2012 | Tunstall-Pedoe |
| 2013/0253913 A1 | 9/2013 | Tunstall-Pedoe |
| 2013/0254182 A1 | 9/2013 | Tunstall-Pedoe |
| 2013/0254221 A1 | 9/2013 | Tunstall-Pedoe |
| 2013/0262125 A1 | 10/2013 | Tunstall-Pedoe |
| 2013/0275121 A1 | 10/2013 | Tunstall-Pedoe |
| 2014/0351281 A1 | 11/2014 | Tunstall-Pedoe |
| 2015/0019200 A1* | 1/2015 | Woodward .......... G06F 17/2836 704/2 |
| 2015/0356463 A1 | 12/2015 | Overell et al. |

OTHER PUBLICATIONS

U.S. Appl. No. 13/925,246, filed Jun. 24, 2013, Holmes, et al.

\* cited by examiner

ADDING TO A KNOWLEDGE BASE USING AN ONTOLOGICAL ANALYSIS OF UNSTRUCTURED TEXT

BACKGROUND

One of the ongoing challenges for a knowledge representation system is the accumulation of knowledge represented in the underlying knowledge base. Many systems still rely on techniques that involve some level of curation by human experts to add knowledge to their respective knowledge bases. Given the vast and ever-increasing scope of human knowledge, such techniques are clearly inadequate to support a knowledge representation system intended to answer questions on even a narrow range of subjects, let alone all of human knowledge.

DETAILED DESCRIPTION

Figure 1:
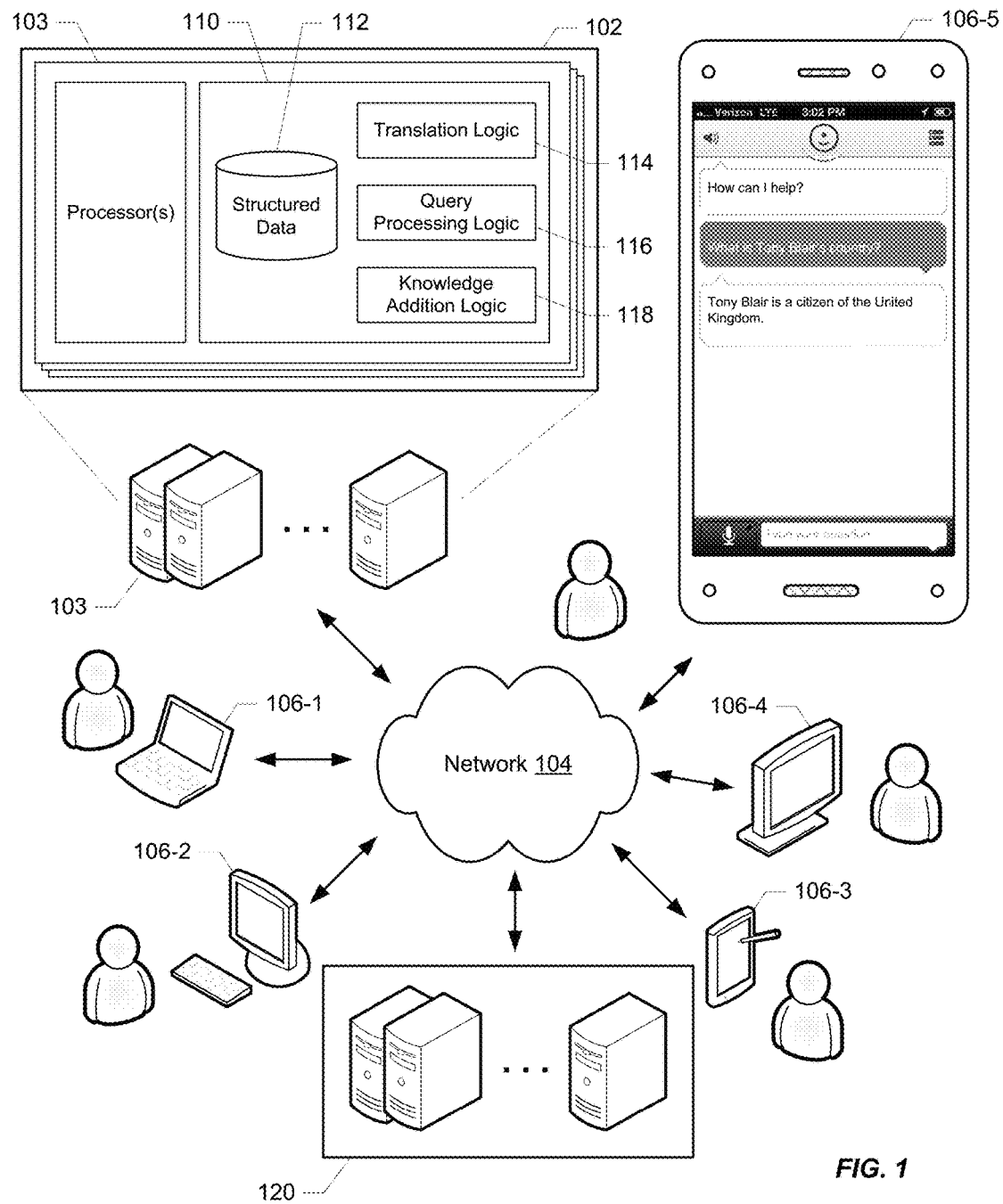
FIG. 1 illustrates an example of a computing environment in which knowledge addition techniques may be employed.

This disclosure describes techniques for adding knowledge to a knowledge base. According to a particular class of implementations, the knowledge base represents knowledge using facts constructed from objects representing entities (i.e., entity objects) and objects representing relations (i.e., relation objects) that apply to the entities with which they are associated. As will be appreciated, the knowledge base may include relation objects for which the corresponding relation is not represented in the knowledge base for one or more of the entity objects. For example, the knowledge base might use the relation object [is a citizen of] to express a fact about the country of citizenship for people represented in the knowledge base. Such a fact might look something like: [tony blair] [is a citizen of] [united kingdom]. Moreover, the relation represented by this relation object might be expressed for some but not all of the people represented in the knowledge base. One approach to handling this is to employ human operators to add a fact expressing this relation manually for each person in the world. However, as will be appreciated, such an approach is impracticable. Instead, implementations enabled by the present disclosure generate new facts for addition to a knowledge base with little or no human intervention by leveraging information already stored in the knowledge base to support the extraction of factual information from unstructured text. This includes the enforcement of ontological constraints to improve the chances that the automatically generated facts make sense. As will be appreciated from the following description, the techniques enabled by this disclosure are highly scalable and may be particularly useful for the extraction of specific types of facts and/or fact generation for specific knowledge domains. An example will be instructive.

Unstructured text (e.g., text derived from the pages of a web site) might be processed to identify references to known entities (e.g., actors, athletes, politicians, companies, bands, sports teams, etc.) and known relations represented in an underlying knowledge base. This information can then be used to construct candidate facts for possible inclusion in the knowledge base. For example, the sentence "Madonna addressed the United Nations" might be processed to generate a candidate "fact triple" of the form [Madonna Louise Ciccone] [spoke to] [United Nations] in which the left hand object is a known entity object corresponding to the well-known pop music star and the right hand object corresponds to the intergovernmental organization established in 1945. Other candidate fact triples might also be formed from the original sentence text including, for example, triples in which the corresponding left hand objects represent a town in the U.S. state of Maryland, and a train station in Turin, Italy. According to various implementations enabled by the present disclosure, these other fact triples can be eliminated by the enforcement of ontological constraints embodied in the underlying knowledge base which limit the classes of entities that may be associated with certain relations. That is, because neither a town nor a train station can speak, fact triples associating these entities with this particular relation would not be allowed or accepted.

As will be discussed, the enforcement of ontological constraints can be relatively simple, i.e., disallowing candidate fact triples for which an identified entity or entity type is incompatible with a particular relation. On the other hand, implementations are contemplated in which richer decision making is supported with information available in the knowledge base. Using the same example, a candidate fact triple might be generated in which the left hand object represents Mary, the mother of Jesus. If the ontological constraint enforcement is based only on entity class (in this case the class "human"), both candidate fact triples involving humans would be allowable. However, because additional information (e.g., metadata, other facts, etc.) may be associated in the knowledge base with the entity objects, such information may be used to eliminate or disallow candidate fact triples on other bases. In the present example, the knowledge base might include metadata representing time periods during which the corresponding entities existed. From this information, the candidate fact triple indicating that the mother of Jesus addressed the United Nations would not be accepted or allowable because the two entities do not overlap in time.

FIG. 1 illustrates an example of a computing environment in which users interact with a knowledge representation system 102 via network 104 using a variety of client devices 106 associated with the corresponding users. Knowledge representation system 102 may conform to any of a wide variety of architectures such as, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable devices capable of connecting to network 104 and consuming services provided by service 102. Such devices may include, for example, mobile devices (e.g., cell phones, smart phones, tablets and wearable devices), personal computers (e.g., laptops and desktops), set top boxes (e.g., for cable and satellite systems), smart televisions, gaming consoles, etc. In addition, at least some of the examples described herein contemplate various distributed computing implementations, e.g., implementations based on computing models capable of enabling ubiquitous, convenient, on-demand network access to a shared pool of computing resources (e.g., networks, servers, storage, applications, and services).

It should also be noted that, despite references to particular computing paradigms and software tools, the computer program instructions on which various implementations are based may correspond to any of a wide variety of programming languages, software tools and data formats, and may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

According to a particular class of implementations, knowledge representation system 102 is an information service for filling information needs (e.g., question answering) using a knowledge base 110 that stores information as structured data 112 (e.g., data stored in a relational database, spreadsheet, etc.). Knowledge base 110 includes translation logic 114 which translates between natural language and an internal format that is compatible with structured data 112. That is, translation logic 114 translates natural language input (e.g., captured speech or entered text received from device 106-5) to internal queries that are then processed with reference to structured data 112. Translation logic 114 also translates responsive data from structured data 112 (i.e., knowledge base data returned in response to the internal queries) and/or its own internal queries requiring further input to natural language for presentation to the user (e.g., on device 106-5). The latter might occur, for example, where the natural language input results in more than one internal query, in which case the internal queries could be translated back to natural language and presented to the user to select the correct interpretation. Query processing logic 116 processes internal queries generated by translation logic 114 with reference to structured data 112 to generate responses which may then be translated to natural language by translation logic 114.

Structured data 112 may represent knowledge as a collection of facts; representing the facts with relation objects that express relations between entities (represented by the entity objects). A fact includes at least one of these entity-relation-entity "triples" as illustrated by the examples identified above and below. A fact may also include other information, e.g., temporal information indicating when the fact is (or was) valid, contextual information indicating a context in which the fact is true, etc. For example, a fact (e.g., [fact1]) expressing a relationship that can change might have a link to a temporal constraint expressed like [fact1] [applies for timeperiod] [timeperiod: [timepoint: "1975" ]; [iafter] which makes an assertion about [fact1] namely that it has been true since 1975 and will be true for the indefinite future. An example of contextual information is a link between a fact and a particular context (e.g., a fictional context such as the Lord of the Rings) in which that fact is true. It should also be noted that structured data 112 might represent the relation between entities without using a relation object. That is, the relation may be represented using other types of data that explicitly or implicitly represent the connection between two entities (i.e., relation data). For example, the relation between two entities might be represented by connections between database table entries. Other suitable ways of representing such relations will be understood to those of skill in the art.

According to a particular class of implementations, the knowledge representation system in which knowledge addition as described herein is supported (e.g., system 102 of FIG. 1) is implemented as described, for example, in U.S. Pat. No. 7,707,160 entitled Knowledge Storage and Retrieval System and Method, and/or U.S. Pat. No. 8,666,928 entitled Knowledge Repository, the entire disclosure of each of which is incorporated herein by reference for all purposes. However, it will be understood that the various functionalities described herein are much more widely applicable. That is, the techniques described herein may be used to support knowledge addition in a broad range of knowledge representation systems. The scope of the invention should therefore not be limited to the specific examples described herein.

Figure 2:
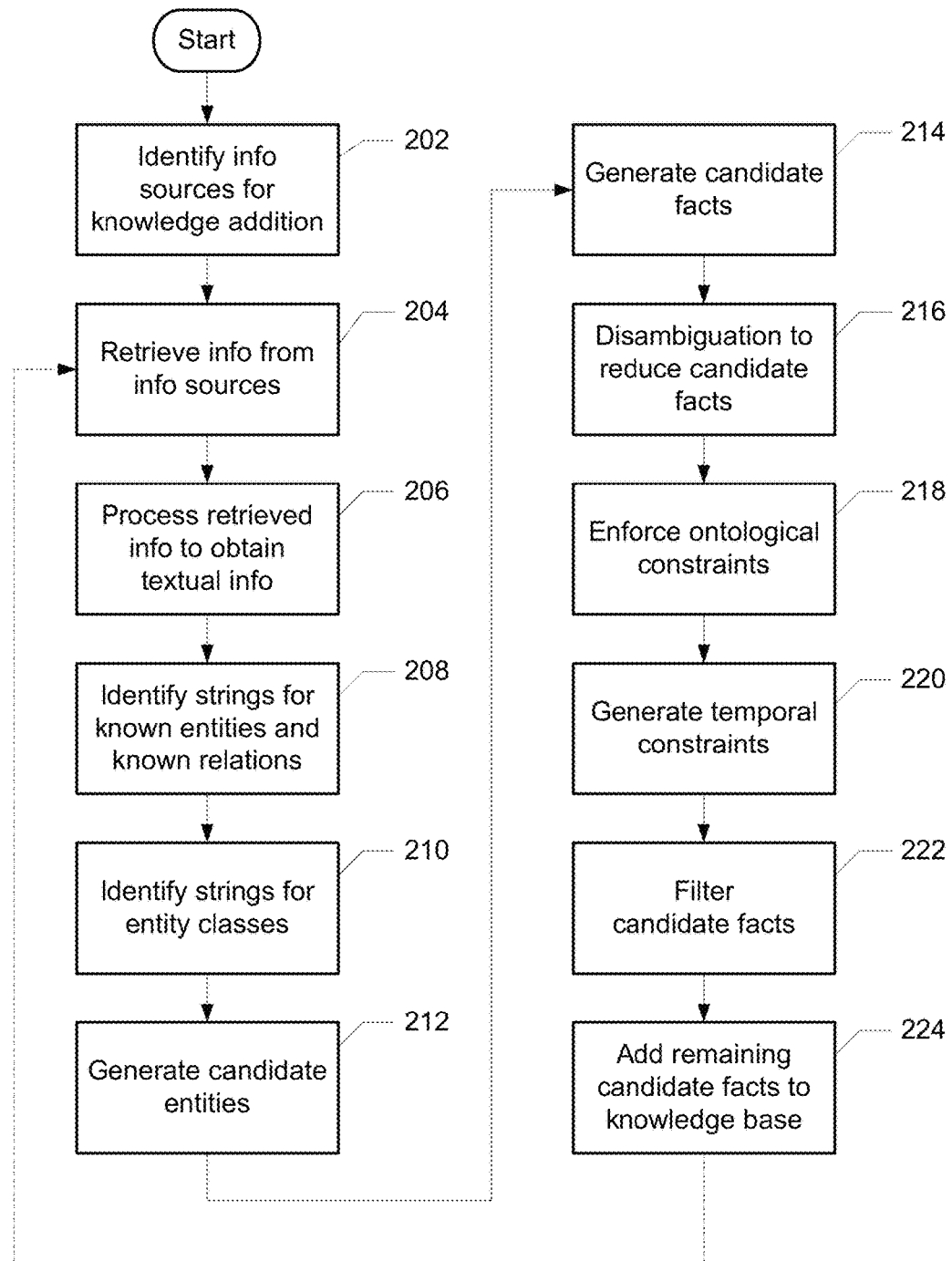
FIG. 2 is a flow diagram illustrating an example of a technique for adding knowledge to a knowledge base.

According to a particular class of implementations, knowledge base 110 includes knowledge addition logic 118 which is configured to generate candidate facts for addition to knowledge base 110, including the enforcement of ontological constraints to support the logical consistency of the facts generated. An example of the operation of a specific implementation of knowledge addition logic will now be described with reference to the flow diagram of FIG. 2.

One or more information sources are identified for the purpose of adding knowledge from those sources to an underlying knowledge base (202). According to a particular class of implementations, these information sources are online information sources accessible via the Internet (e.g., web sites and their constituent pages). However, implementations are contemplated in which a broader range of information sources might be used. The information sources may or may not relate to a particular information domain and may be selected based on a variety of factors including, for example, the likelihood of including factual information, the general reliability of the source, the format in which information is presented, the editorial style associated with the information source, etc. Examples of such online sources of information might include general information sites (e.g., online encyclopedias, general news sites, etc.), or domain-specific information sites that focus on particular subject matter, i.e., information domains, (e.g., movie sites, sports sites, entertainment sites, political sites, etc.). As will be appreciated the number and types of information sources may vary considerably for a given application.

Information is obtained from the identified information sources for the purpose of adding knowledge to the knowledge base (204). This might involve, for example, the use of a web crawler to retrieve web pages from designated web sites, and may occur repeatedly (e.g., periodically or in response to publication events) to ensure that newly published information is captured (as represented by the dashed arrow). As will be appreciated, subsequent retrievals may only capture new information, e.g., newly added or edited pages.

If not already in the form of text, the information obtained from the information sources may be processed to obtain textual information (206). In the example of web pages, this might involve the parsing of the page HTML to isolate textual content from other HTML components.

The textual information is processed to identify strings of text that correspond to known entities and known relations (208), i.e., entities and relations that are already represented in the knowledge base. According to a particular class of implementations, the knowledge base associates one or more strings of text with each object in the knowledge base that represents an entity or a relation. These strings of text correspond to ways in which the entity object or relation object with which they are associated may be expressed in natural language and may take the form ["string"] [relation] [object] where the left object is the natural language string, the right object is the known knowledge base object to which the string corresponds, and the middle object is a relation object which expresses the nature of the relationship between the two. The textual information derived from the information sources is compared to all or some subset of the strings of text in the knowledge base to determine whether any of the strings in the textual information might correspond to a known entity or a known relation.

For example, the triple ["Obama's"] [can denote a possessive of] [barack hussein obama] associates the text "Obama's" (on the left) with the entity object corresponding to Barack Obama (on the right). Similarly, ["President Obama"] [can denote] [barack hussein obama] associates the text "President Obama" with the same entity object. Thus, if either of those text strings appears in the textual information, the corresponding entity object would be identified. It should be noted that the known object might be on the left and the natural language string on the right, i.e., [object] [relation] ["string"]. Known relations may be similarly associated with the strings of natural language text by which they are commonly represented. More examples of how knowledge base objects may be associated with natural language strings of text are provided in U.S. Pat. Nos. 7,707,160 and 8,666,928 incorporated herein by reference above.

The textual information derived from the information sources is also processed to identify strings of text that may correspond to one or more entity types or classes represented in the knowledge base (210). That is the textual information may include references to entities that are not yet known in the knowledge base but which may be identified using natural language processing (NLP) and/or named entity recognition (NER) techniques. Such NLP techniques include, for example, sentence splitting, part of speech tagging, lemmatisation (or stemming), syntactic parsing (e.g., dependency parsing), etc., and may be performed using conventional tools such as, for example, components from Stanford CoreNLP. Stanford CoreNLP is supported by The Stanford Natural Language Processing Group at Stanford University and provides a set of natural language analysis tools which can take raw text input and give the base forms of words, their parts of speech, mark up the structure of sentences in terms of phrases and word dependencies, etc. NER techniques label words and phrases appearing in text that are the names of things (e.g., people, places, companies, band names, albums, tracks, movies, etc.) and may be performed using, for example, Stanford NER. Stanford NER is also supported by the Stanford Natural Language Processing Group. Candidate entities in the object format of the knowledge base are formed using the strings of text identified in this way (212). As will be appreciated, a wide variety of conventional and proprietary tools may be used to support entity recognition in support of implementations enabled by the present disclosure.

Candidate facts are formed using the known entities, the known relations, and the candidate entities (214). According to various implementations, this may be done with reference to the relationships (e.g., linguistic, semantic, proximity, etc.) among the corresponding strings of text in the context of the textual information. That is, syntactic and semantic heuristic rules may be applied to identify which strings of text (and thus the corresponding entities, entity classes, and relations) relate to a single factual assertion. Examples of such techniques based on NLP rules include the Rule-based Text Annotation (Ruta) which is part of the Unstructured Information Management Architecture (UIMA) from The Apache Software Foundation (https://uima.apache.org/ruta.html), and the Java Annotation Patterns Engine (JAPE) of the General Architecture for Text Engineering (GATE) (https://gate.ac.uk/userguide/chap:jape) from The University of Sheffield Department of Computer Science. These systems allow the expression of rules that encode constraints required for a sentence (fragment) to be identified as a statement of fact. The constraints are expressed in terms of previously produced annotations, and can encode any kind of information, usually morphological (part of speech), syntactic structure, or semantic (e.g., the mention of a particular relation, or entity class). The result may be a set of candidate facts represented, for example, in the form [known object] [known relation][known object]; [candidate object][known relation][known object]; or[known object] [known relation][candidate object].

According to some implementations, disambiguation may reduce the number of candidate facts generated (216). That is, a particular string of text in the textual information might map to more than one known entity in the knowledge base or more than one entity class. In such cases, additional information associated with the string of text in or representing the context of the string may be used to eliminate unlikely interpretations. For example, an entity can be compared with the subject matter of the page or document from which it was derived, e.g., because a reference to "Pele" is on a sports-related web site it can be inferred that it is a likely reference to the great Brazilian soccer player rather than the Hawaiian volcano goddess. In another example, pop-music-related terminology might be used to determine that a reference to "Madonna" is unlikely to be referring to the mother of Jesus (although this might not rule out that it could represent either the pop singer or the song by the Beatles). As will be appreciated, entities and/or candidate facts can be eliminated using such information, significantly improving the efficiency of the overall process.

According to some implementations, disambiguation may be accomplished by collectively evaluating candidate facts that are derived from the same page or document. For example, if multiple candidate facts on a page are determined to relate to a common subject, a higher level of confidence can be assigned individual candidate facts from that source that relate to that subject. In another example, if multiple facts about a particular entity are derived from the same document, facts about that entity from that document can be assigned a higher level of confidence than, for example, a single isolated fact about the entity in another document. One constraint that might be enforced, for example, is to exclude candidate facts that are determined to be isolated reference.

Enforcement of a set of ontological constraints excludes associations between at least some of the known relations and the identified entities or entity classes (218). Depending on the implementation, this may involve the filtering of candidate facts to remove candidate facts for which a known or candidate entity is ontologically incompatible with the relation with which it has been associated (i.e., 218 is performed after 214). Alternatively, formation of such candidate facts might be prevented in the first place (i.e., 218 is performed as part of 214). Regardless of which approach is taken, and according to a particular class of implementations in which the ontological constraints are represented in the knowledge base, the filtering or formation of a fact depends, at least in part, on the types or classes of entities with which a given relation is ontologically compatible. For example, if a candidate facts asserts (or would assert) that a building works for a company, it is considered invalid because buildings don't have jobs in the way humans do.

According to some implementations, the enforcement of ontological constraints may be entirely deterministic, i.e., a combination of a particular relation with a particular entity class is either allowed or it is not. However, implementations are also contemplated in which the enforcement of ontological constraints involves richer decision making. That is, because we know the class (and possibly other attributes) of the entities, and also have access to the context of the corresponding strings of text, we have a potentially rich information set on which to base this constraints enforcement. For example, there are some combinations of entities/entity classes and relations that are theoretically possible but unlikely, e.g., a relation that represents a causal connection between one entity and another might be very broad and does not strictly rule out being associated with a range of entities. But it might be extremely unlikely that a candidate fact that asserts that something "caused" a human being would be considered valid. In another example, an album can be released (by a record company) on a date and an athlete can be released (by a team) on a date; the interpretation of the named entity (album or athlete), and thus the validity of a particular combination, can be made based on other information in the context of the page from which the candidate fact originated, e.g., sports-related terms vs. music-related terms. A wide range of such examples will be appreciated by those of skill in the art.

Referring again to FIG. 2, temporal constraints may be generated for at least some of the candidate facts from the textual information (220). That is, in some cases temporal information is associated with the strings of text in the textual information from which candidate facts are derived. A temporal constraint generated from this temporal information represents a time or time frame at or during which the corresponding candidate fact is valid. For example, the Wikipedia page for baseball player Nori Aoki states that "Aoki signed a one-year deal with the San Francisco Giants on Jan. 19, 2015." This might result in generation of a candidate fact of the form [norichika aoki] [is a member of] [san francisco giants baseball club]. However, prior to Jan. 19, 2015, Aoki was a member of the Kansas City Royals, so the candidate fact is not true for periods of time prior to that date. To handle this potential inconsistency, the temporal information in the original text may be used to generate a temporal constraint for the candidate fact which asserts the associated fact to be true or valid only after Jan. 19, 2015. As will be appreciated, a temporal constraint may be specified in a variety of ways such as, for example, a time range, a point in time, a range relative to a point in time, etc.

Some temporal constraints may not be directly identified from textual information, but inferred using general heuristics depending upon the semantics of the relation in question. For example, capital cities do not often change, so the phrase "France's capital city Paris" might generate [fact1]: [paris] [is the capital of] [france] together with (even in the absence of specifically temporal textual information) another fact saying that fact1 holds from the time the page was authored indefinitely into the future. However, temporal information can also be filtered for consistency in a similar way to the way that other semantic constraints are applied. For example, were the phrase "West Germany's capital city Bonn" to generate a similar fact, the associated temporal information should not extend into the indefinite future since West Germany no longer exists. Rules to ascribe temporal information may also depend upon the date of authorship of the source, and be constrained by that date (e.g., a 2010 source should not be understood to ascribe a 2013 date of birth).

The set of candidate facts may be further filtered to reduce its size and/or eliminate redundancies (222). For example, some candidate facts may correspond to facts that are already represented in the underlying knowledge base. That is, text representing the same factual assertion may be included in many different sources of information; some of which may even derive their assertions from others of the sources. It is therefore likely that some factual assertions will be captured more than once. A mechanism for identifying such redundancies prior to integrating candidate facts in the knowledge base may therefore be an important optimization.

According to some implementations, the identification of previously known facts may be leveraged to endorse existing facts in the knowledge base, as well as to assign higher confidence levels to other candidate facts. For example, if a candidate fact corresponds to a fact already existing in the knowledge base but was derived from a different source than the existing fact it may be inferred that, because multiple sources include the same factual assertion, the existing fact in the database can be endorsed, e.g., by assigning a higher level of confidence for the reliability of that fact. In another example, if a candidate fact is determined to already be present in the knowledge base it may be inferred that the candidate fact has some measure of reliability (i.e., because facts in the knowledge base are presumed to be valid) and that therefore, other candidate facts derived from the same source as the first candidate fact may be assigned a higher level of confidence.

At least some of the remaining candidate facts are then added to the knowledge base (224). According to some implementations, this may involve exporting the candidate facts to an independent knowledge addition pipeline in which additional reliability checks may be performed. See examples of knowledge addition described in U.S. Pat. Nos. 7,707,160 and 8,666,928, incorporated herein by reference above, as well as U.S. Patent Publication No. 2011/0307435 entitled Extracting Structured Knowledge from Unstructured Text, and U.S. patent application Ser. No. 13/925,627 entitled Adding To a Knowledge Base Using Web Search, the entire disclosures of both of which are incorporated herein by reference for all purposes.

According to some implementations, additional information, e.g., metadata, may be associated with the candidate facts that are added to the knowledge base. Such metadata might include, for example, the source from which the fact was derived (e.g., page, document, site, etc.), the date and/or time at which the fact was extracted, the knowledge domain of the source, etc. Such information might be useful as a kind of audit trail for tracking various types of information. For example, in the example described above, a knowledge base fact might be endorsed if it has been derived from multiple sources (e.g., as indicated by the fact metadata). In another example, the reliability of particular information sources can be tracked by determining the extent to which facts derived from a source agree or disagree with facts derived from other sources.

Figure 3:
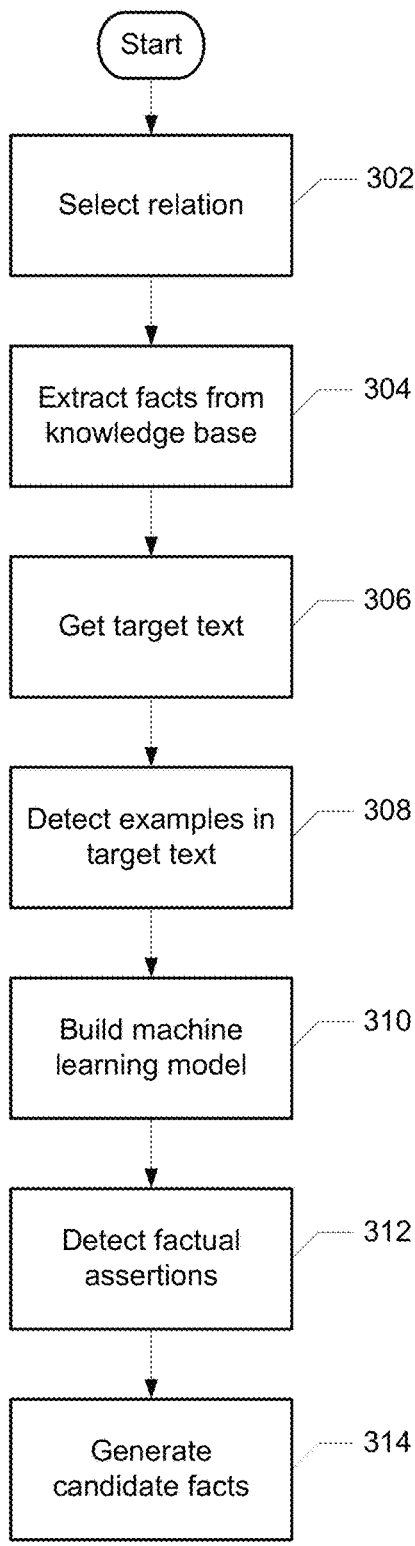
FIG. 3 is a flow diagram illustrating training of a machine learning process to identify factual assertions in unstructured text.

As will be appreciated with reference to the foregoing, the present disclosure enables implementations in which existing knowledge in a knowledge base is leveraged to support the partially or fully-automated extraction of new knowledge from arbitrary sources of information in a scalable and reliable manner. And as should also be appreciated, at least some aspects of system operation may be supported and/or enhanced through the use of machine learning techniques. For example, classifiers can be trained to recognize entities and relations and to identify valid facts in a set of candidate facts using known text that includes valid factual assertions as training data. An example of such a use of machine learning to support knowledge addition is shown in FIG. 3. As will be appreciated, the technique illustrated in FIG. 3 might be used independently or in conjunction with the technique described above with reference to FIG. 2. For example, the technique described below might be used to generate at least some of the candidate facts represented by 214, and then be processed in accordance with 216-224. Alternatively, the technique of FIG. 3 might be part of an alternative pathway for adding knowledge to a knowledge base.

In the depicted example, a specific relation that is known in a knowledge base is selected for generation of candidate facts (302), e.g., the relation "is the birthdate of." Examples of valid facts for the selected relation are then extracted from the knowledge base (304). For example, known birthdays for some subset of the humans represented in the knowledge base could be extracted.

Target text that includes factual assertions corresponding to the facts extracted from the knowledge base is also obtained (306). The target text for a given knowledge base fact may be, for example, text derived from an online information source from which the fact was originally derived. Alternatively, it might be retrieved from an online information source because it is highly likely to include such a factual assertion (e.g., the Wikipedia page for the person whose birthday is represented by one of the extracted facts).

The valid facts extracted from the knowledge base and the corresponding target text are used to detect positive and negative examples of natural language factual assertions in the target text (308). These examples are then used to build and tune a machine learning model (310) using, for example, a mix of syntactic and semantic features, and grid search, Gaussian process based hyper parameter optimization, or other suitable techniques. Once the model is constructed, it can be applied to target text corresponding to entities in the knowledge base for which the facts based on the selected relation are not expressed (312), thus generating new candidate facts for addition to the knowledge base (314), e.g., as described above.

According to some implementations, such a process may be run in the background as a daemon which periodically attempts to expand the knowledge base by training and applying an array of relation-specific models. As will be appreciated, this is only one example of the ways in which machine learning techniques may be used to support techniques enabled by the present disclosure.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product for adding knowledge to a knowledge base in a computing network, the knowledge base including a plurality of known entity objects and a plurality of known relation objects represented in a machine-readable format of the knowledge base, the knowledge base also including a plurality of known facts, each known fact including one of the known relation objects and at least one of the known entity objects, the computer program product comprising one or more non-transitory computer-readable media having computer program instructions stored therein, the computer program instructions being configured such that, when executed, the computer program instructions cause one or more computing devices to:

identify one or more online information sources relating to subject matter within a particular information domain;

obtain textual information from the one or more online information sources;

identify known strings of text from the textual information based on corresponding known facts in the knowledge base that relate each of the known strings of text to one or more of the known entity objects or one or more of the known relation objects;

identify candidate strings of text from the textual information based on correspondence of each of the candidate strings of text to at least one of a plurality of entity classes represented in the knowledge base;

generate candidate entity objects in the machine-readable format of the knowledge base by extracting corresponding entity information from the candidate strings of text;

identify, from the textual information using natural language processing, relationships among the strings of text corresponding to the known entity objects, the known relation objects, and the candidate entity objects;

generate candidate facts by forming fact triples using the known entity objects, the known relation objects, and the candidate entity objects and based on the relationships among the corresponding strings of text in the textual information;

identify temporal information in the textual information, the temporal information being a natural language representation of time;

generate a temporal constraint using the machine-readable format of the knowledge base from the temporal information for at least one of the candidate facts, the temporal constraint representing a time or a period of time during which the corresponding candidate fact is valid;

filter the candidate facts to remove each of the candidate facts for which an associated known entity object or an associated candidate entity object is ontologically incompatible with a corresponding one of the known relation objects in that the associated known entity object or the associated known candidate entity object corresponds to an entity class that is incompatible with a relation expressed by the known relation object; and add one of the remaining candidate facts to the knowledge base.

2. The computer program product of claim 1, wherein the computer program instructions are further configured to cause the one or more computing devices to filter the candidate facts to remove each of the candidate facts that is determined to be unlikely to be true before adding the remaining candidate facts to the knowledge base.

3. A computer-implemented method for adding knowledge to a knowledge base, the knowledge base including a plurality of known entity objects and a plurality of known relation objects represented in a machine-readable format of the knowledge base, the knowledge base also including a plurality of known facts, each known fact including one of the known relation objects and at least one of the known entity objects, the method comprising:

identifying known strings of text from textual information based on corresponding known facts in the knowledge base that relate each of the known strings of text to one or more of the known entity objects or one or more of the known relation objects;

identifying candidate strings of text from the textual information based on correspondence of each of the candidate strings of text to at least one of a plurality of entity classes represented in the knowledge base;

generating candidate entity objects in the machine-readable format of the knowledge base based on the candidate strings of text;

based on natural language processing of the textual information, identifying relationships among the strings of text corresponding to the known entity objects, the known relation objects, and the candidate entity objects;

generating candidate facts using the known entity objects, the known relation objects, and the candidate entity objects and based on the relationships among the known and candidate strings of text in the textual information;

identifying temporal information in the textual information, the temporal information being a natural language representation of time;

generating a temporal constraint from the temporal information for at least one of the candidate facts using the machine-readable format of the knowledge base, the temporal constraint representing a time or a period of time during which the corresponding candidate fact is valid; and adding at least some of the candidate facts to the knowledge base.

4. The method of claim 3, wherein generating the candidate facts includes filtering pre-candidate facts to remove each pre-candidate fact for which an associated known entity object or an associated candidate entity object is ontologically incompatible with a corresponding one of the known relation objects.

5. The method of claim 3, wherein generating the candidate facts includes preventing formation of candidate facts for which an associated known entity object or an associated candidate entity object is ontologically incompatible with a corresponding one of the known relation objects.

6. The method of claim 3, wherein a subset of the candidate facts associates two of the known entity objects with one of the known relation objects, the method further comprising filtering the subset of the candidate facts to remove preexisting facts already represented in the knowledge base.

7. The method of claim 3, wherein processing the textual information includes one or more of the following natural language processing techniques: sentence splitting, part of speech tagging, lemmatization, stemming, named entity recognition, or syntactic parsing.

8. The method of claim 3, wherein a set including multiple candidate facts represents a plurality of different interpretations of a same set of text strings, the method further comprising disambiguating the set of candidate facts to remove unlikely interpretations of the corresponding text strings.

9. The method of claim 3, further comprising identifying a first candidate fact as corresponding to a preexisting fact represented in the knowledge base, and endorsing the preexisting fact if the first candidate fact was derived from a different information source than the preexisting fact.

10. The method of claim 3, further comprising identifying a first candidate fact as corresponding to a preexisting fact represented in the knowledge base, and identifying a second candidate fact as reliable based on an association between the first candidate fact and the second candidate fact.

11. A computing system, comprising:

one or more data stores in a computing network, the one or more data stores having a knowledge base stored therein including a plurality of known entity objects and a plurality of known relation objects represented in a machine-readable format of the knowledge base, the knowledge base also including a plurality of known facts, each known fact including one of the known relation objects and at least one of the known entity objects; and one or more computing device in the computing network configured to:

identify known strings of text from textual information based on corresponding known facts in the knowledge base that relate each of the known strings of text to one or more of the known entity objects or one or more of the known relation objects;

identify candidate strings of text from the textual information based on correspondence of each of the candidate strings of text to at least one of a plurality of entity classes represented in the knowledge base;

generating candidate entity objects in the machine-readable format of the knowledge base based on the candidate strings of text;

based on natural language processing of the textual information, identifying relationships among the strings of text corresponding to the known entity objects, the known relation objects, and the candidate entity objects;

generate candidate facts using the known entity objects, the known relation objects, and the candidate entity objects and based on the relationships among the known and candidate strings of text in the textual information;

identifying temporal information in the textual information, the temporal information being a natural language representation of time;

generating a temporal constraint from the temporal information for at least one of the candidate facts using the machine-readable format of the knowledge base, the temporal constraint representing a time or a period of time during which the corresponding candidate fact is valid; and add at least some of the candidate facts to the knowledge base.

12. The computing system of claim 11, wherein the one or more computing devices are configured to generate the candidate facts by filtering pre-candidate facts to remove each pre-candidate fact for which an associated known entity object or an associated candidate entity object is ontologically incompatible with a corresponding one of the known relation objects.

13. The computing system of claim 11, wherein the one or more computing devices are configured to generate the candidate facts by preventing formation of candidate facts for which an associated known entity object or an associated candidate entity object is ontologically incompatible with a corresponding one of the known relation objects.

14. The computing system of claim 11, wherein a subset of the candidate facts associates two of the known entity objects with one of the known relation objects, and wherein the one or more computing devices are further configured to filter the subset of the candidate facts to remove preexisting facts already represented in the knowledge base.

15. The computing system of claim 11, wherein the one or more computing devices are configured to process the textual information using one or more of the following natural language processing techniques: sentence splitting, part of speech tagging, lemmatization, stemming, named entity recognition, or syntactic parsing.

16. The computing system of claim 11, wherein a set including multiple candidate facts represents a plurality of different interpretations of a same set of text strings, and wherein the one or more computing devices are further configured to disambiguate the set of candidate facts to remove unlikely interpretations of the corresponding text strings.

\* \* \* \* \*